G. W. BOLSER.
INNER TUBE FOR TIRES.
APPLICATION FILED APR. 12, 1921.

1,429,015

Patented Sept. 12, 1922.

Inventor
George W. Bolser.

By J. Reaney Kelly, Attorney

Patented Sept. 12, 1922.

1,429,015

UNITED STATES PATENT OFFICE.

GEORGE W. BOLSER, OF CLEVELAND, OHIO.

INNER TUBE FOR TIRES.

Application filed April 12, 1921. Serial No. 460,685.

*To all whom it may concern:*

Be it known that I, GEORGE W. BOLSER, citizen of the United States, residing at Cleveland, in the county of Cuyahoga and State of Ohio, have invented certain new and useful Improvements in Inner Tubes for Tires, of which the following is a specification.

This invention relates to pneumatic tires and more particularly to an inner tube for automobile and cycle tires.

As its primary object the invention aims to provide an improved inner tube which by reason of its novel and peculiar construction is puncture proof and substantially blow-out proof.

Another object of the invention is to provide a tube designed with a series of radially tapering folds arranged in accordion fashion whereby when the tube is inflated, that portion thereof opposite the tread surface of the tire shoe will be in the state of compression instead of expansion as is the case in conventional inner tubes.

A still further object of the invention is to provide a tube of the above character which is simple in construction, strong and durable and comparatively inexpensive to manufacture.

Various other objects and advantages of my invention will become apparent during the continuance of the following description.

In the drawings:—

In describing my invention in detail, 1 designates the rim of an automobile wheel of the usual type to which is applied a tire shoe or casing 2. Within the casing 2 is arranged the improved tube of my invention.

Figure 1:
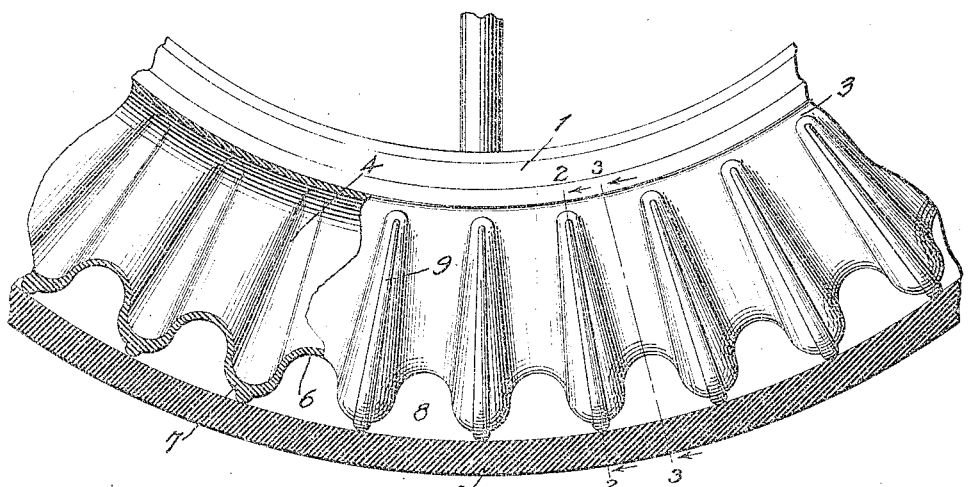
Figure 1 is a view in detail side elevation, partly in section, showing my invention in its preferred embodiment, deflated and associated with an automobile wheel and tire shoe of conventional form.
Figure 2:
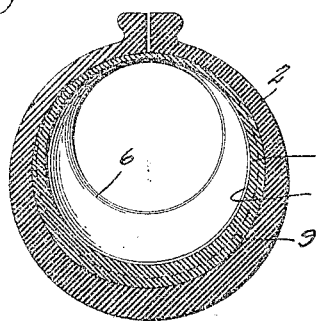
Figure 2 is a view in transverse cross section taken on line 2—2 of Figure 1.
Figure 3:
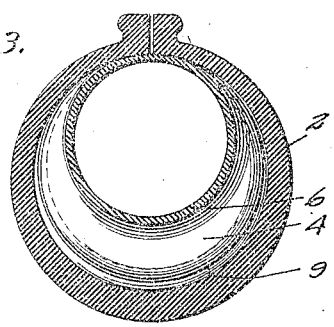
Figure 3 is a view in transverse cross section taken on line 3—3 of Figure 1.

The tube 3 is made of a suitable grade of rubber and is provided with a series of folds or pleats in accordion fashion, designated by the numeral 4, said folds or pleats tapering larger toward the outer or tread surface of the tube as clearly shown in Figure 1 of the drawing. This construction provides inner and outer folds or pleats and the inner folds or pleats are designated by the numeral 6. It is also contemplated to increase the thickness of the tube about the outer folds or pleats 4, as shown at 7, so as to provide for reinforcement and at the same time, compensate for the varying thickness of the tube about the inner folds or pleats 6, as will be hereinafter described.

The advantage derived from tapering folds or pleats 4 as shown in Figure 1 is obvious. They reinforce the tube and when the tube is inflated, cause a radial compression to be exerted upon the part of the tube comprising the inner folds or pleats 6 so that the inner pleats will be under a compression stress instead of an expansion one.

Figure 4:
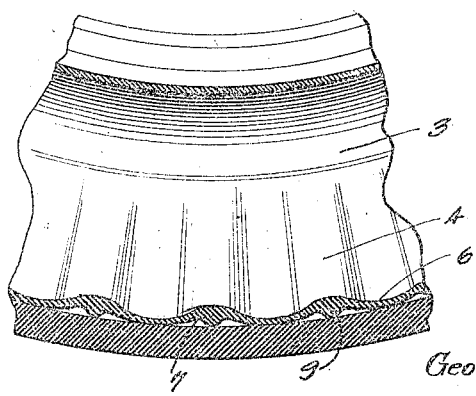
Figure 4 is a view in longitudinal cross section taken through the tire shoe and inner tube when the latter is in an inflated condition.

When the tube is deflated as shown in Figure 1, channels 8 will be formed between the outer folds or pleats 4 but when the tube is inflated, as shown in Figure 4, the inner folds or pleats 6 will be compressed outwardly, substantially closing the channels 8 and producing a radial compression on the inner and outer folds. Thus, in the course of use, if a sharp pointed article should be picked up by the tire shoe and should enter the inner tube, instead of causing a puncture such as would result if a conventional tube was used, the tendency of the tube of my invention is to grip the article firmly and prevent the escape of air. Moreover, when the article is removed, the tendency of the tube will be to firmly close the opening formed by the article and prevent the escape of air from the tire.

In order to reinforce the outer folds or pleats 4 and at the same time provide for firmly holding the tube in place within the tire to prevent slipping thereof during operation, I provide the outer pleats 4 with a tapering bead 9 which extends about the outer surface of the folds or pleats and tapers larger toward the larger portion of the respective folds or pleats. When the tube is inflated as shown in Figure 4, the bead will be pressed firmly against the inner surface of the tire shoe and, as above described, will prevent slipping of the tube and the holding of same firmly in place.

From the foregoing it is believed that the advantages and novel features of my invention will be readily understood and therefore further detailed description is deemed unnecessary.

What is claimed is:—

1. The combination with a tire casing, of an inner tube provided with a series of pleats or folds extending in accordion fashion around the tube when the latter is deflated, said pleats or folds being adapted to flatten outwardly against the inner wall of the casing when the tube is inflated, an outwardly projecting bead formed on the outer surface of said pleats or folds and adapted to engage the inner surface of the tire casing to prevent creeping of the tube within the casing.

2. The combination with a tire casing, of an inner tube formed in accordion fashion with folds and annular channels between said folds, said folds tapering larger from the inner surface to the outer or tread surface of the tube, said tube having the material forming the said channels between the folds of relatively small thickness and adapted for expansion outwardly between the folds to close said channels and contact with the inner walls of the casing when the tube is inflated, the said channel closing portion when inflated, being compressed between the folds to a thickness corresponding to the thickness of the latter whereby a tread of uniform thickness is provided.

In testimony whereof I affix my signature.

GEORGE W. BOLSER